US009917694B1

(12) United States Patent
Juels et al.

(10) Patent No.: US 9,917,694 B1
(45) Date of Patent: Mar. 13, 2018

(54) KEY PROVISIONING METHOD AND APPARATUS FOR AUTHENTICATION TOKENS

(71) Applicant: EMC Corporation, Hopkinton, MA (US)

(72) Inventors: Ari Juels, Brookline, MA (US); David D. Taku, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 14/092,028

(22) Filed: Nov. 27, 2013

(51) Int. Cl.
*H04L 29/06* (2006.01)
*H04L 9/08* (2006.01)

(52) U.S. Cl.
CPC ............ *H04L 9/083* (2013.01); *H04L 9/0861* (2013.01)

(58) Field of Classification Search
CPC . H04L 63/0823; H04L 9/3263; H04L 9/0825; H04L 63/0838; H04L 9/3228; G06F 21/34; G06F 21/445; G06F 21/33
See application file for complete search history.

(56) References Cited

U.S. PATENT DOCUMENTS

| 5,784,463 A * | 7/1998 | Chen et al. .................. 713/171 |
| 7,685,631 B1 * | 3/2010 | Paya et al. ......................... 726/8 |
| 8,087,074 B2 * | 12/2011 | Popp .................... H04L 9/3228 713/159 |
| 8,468,361 B2 * | 6/2013 | Buer .................. H04L 63/0428 713/168 |
| 8,510,816 B2 * | 8/2013 | Quach et al. ..................... 726/7 |
| 2004/0117626 A1 * | 6/2004 | Andreasyan .................. 713/175 |
| 2005/0188202 A1 * | 8/2005 | Popp .............................. 713/175 |
| 2006/0177056 A1 * | 8/2006 | Rostin .................. H04L 9/0869 380/46 |
| 2007/0050635 A1 * | 3/2007 | Popp .................... H04L 9/0863 713/185 |
| 2007/0118891 A1 * | 5/2007 | Buer ................................ 726/8 |

(Continued)

FOREIGN PATENT DOCUMENTS

EP          1933252 A1 *    6/2008    ............. G06F 21/00

OTHER PUBLICATIONS

Microsoft, Understanding Digital Certificates, May 19, 2005, Microsoft, 6 Pages.*

*Primary Examiner* — Farid Homayounmehr
*Assistant Examiner* — Christopher C Harris
(74) *Attorney, Agent, or Firm* — Ryan, Mason & Lewis, LLP (57) ABSTRACT

A processing device is configured to obtain an address and a public key, both associated with an authentication service, to generate a symmetric key as a function of the public key, to configure an authentication token to incorporate the symmetric key, to encrypt the symmetric key utilizing the public key, and to transmit the encrypted symmetric key to the address so as to permit the authentication service to bind the symmetric key to an identifier of the authentication token. By way of example, the authentication token may comprise a software authentication token implemented on the processing device. One or more tokencodes generated by the authentication token utilizing the symmetric key are transmitted to the authentication service for authentication. The authentication by the authentication service is based on the symmetric key bound to the identifier of the authentication token.

23 Claims, 2 Drawing Sheets

(56) References Cited

U.S. PATENT DOCUMENTS

| | | | |
|---|---|---|---|
| 2007/0250923 A1* | 10/2007 | M'Raihi | G06F 21/34 726/18 |
| 2008/0123843 A1* | 5/2008 | Machani | H04L 9/0822 380/44 |
| 2009/0006858 A1* | 1/2009 | Duane et al. | 713/185 |
| 2009/0150974 A1* | 6/2009 | Cho et al. | 726/2 |
| 2009/0259848 A1* | 10/2009 | Williams | H04L 63/0838 713/168 |
| 2010/0146275 A1* | 6/2010 | Slick et al. | 713/169 |
| 2011/0158411 A1* | 6/2011 | Medvinsky et al. | 380/279 |
| 2012/0233684 A1* | 9/2012 | Denis | G06F 21/335 726/9 |
| 2014/0115341 A1* | 4/2014 | Robertson | H04L 9/3228 713/183 |
| 2014/0281506 A1* | 9/2014 | Redberg et al. | 713/159 |
| 2015/0020178 A1* | 1/2015 | Grunin | H04L 63/08 726/7 |

* cited by examiner

FIG. 2

KEY PROVISIONING METHOD AND APPARATUS FOR AUTHENTICATION TOKENS

FIELD

The field relates generally to authentication systems, and more particularly to authentication techniques implemented using hardware or software authentication tokens that generate tokencodes.

BACKGROUND

Hardware authentication tokens are typically implemented as small, hand-held devices that display a series of tokencodes over time. A user equipped with such a hardware authentication token reads the currently displayed tokencode and enters it into a mobile telephone, computer or other element of an authentication system as part of an authentication operation. It is also known to incorporate software authentication tokens in mobile telephones, computers or other user devices. The dynamic tokencodes provided by hardware or software authentication tokens offer a significant security improvement over authentication based on a static password.

Authentication tokens are typically provisioned with a random seed or other type of secret key that is also stored in a token record file of the authentication system. The token record file is loaded into an authentication server, such that the server can create matching tokencodes for the authentication token based on the secret key and the current time or current event count. When the user first activates the token, the server stores a personal identification number (PIN) for the user in association with the secret key corresponding to the activated token.

Conventional authentication tokens include both time-synchronous and event-synchronous tokens.

In a typical time-synchronous token, the displayed tokencodes are based on the secret key and the time of day. An authentication server with access to the secret key and a time of day clock can verify that a given presented tokencode is valid.

One particular example of a time-synchronous authentication token is the RSA SecurID® user authentication token, commercially available from RSA, The Security Division of EMC Corporation, of Bedford, Mass., U.S.A. Software versions of this exemplary time-synchronous authentication token, commonly referred to as RSA SecurID® software authenticators, are also commercially available.

Event-synchronous tokens generate tokencodes in response to a designated event, such as a user pressing a button on the token. Each time the button is pressed, a new tokencode is generated based on the secret key and an event counter. An authentication server with access to the secret key and the current event count can verify that a given presented tokencode is valid.

Other known types of authentication tokens include hybrid time-synchronous and event-synchronous tokens.

Many authentication systems are configured to require that a user enter the PIN in addition to entering the tokencode from the authentication token. This provides an additional security factor, based on something the user knows, thereby protecting against unauthorized use of an authentication token that is lost or stolen. Such an arrangement is generally referred to as two-factor authentication, in that authentication is based on something the user has (e.g., the authentication token) as well as something the user knows (e.g., the PIN).

In order to gain access to a protected resource, the user typically enters the PIN into a user device and the current tokencode displayed on his or her authentication token is also entered or otherwise obtained by the user device. The protected resource receives this information from the user device and passes it on to the authentication server, or the user device may provide the information directly to the authentication server. The authentication server will then check if the provided PIN and tokencode information matches the information it has for the user in its token record file in order to authenticate the user. If the user is successfully authenticated by the authentication server, access to the protected resource is granted, and otherwise access to the protected resource is denied.

A number of issues can arise when initially provisioning certain types of authentication tokens with their respective secret keys. For example, such provisioning in the context of configuring a mobile telephone, computer or other user device to implement certain types of software authentication tokens can be an unduly burdensome process for the user, possibly requiring manual help desk support. In addition, communication channels utilized in conjunction with this initial provisioning may in some cases lack adequate security protections and therefore can be vulnerable to a variety of different types of attacks, including man-in-the-middle attacks.

SUMMARY

Illustrative embodiments of the present invention provide improved techniques for provisioning an authentication token with a secret key. For example, in some embodiments, a symmetric key is generated in a software application on a user device and registered securely with a remote authentication service whose identity is provided externally to the application over a potentially untrusted channel. Such an arrangement does not require extensive user involvement, and can prevent man-in-the-middle attacks against the untrusted channel, such as interception of token initialization data by an adversary.

In one embodiment, a processing device is configured to obtain an address and a public key, both associated with an authentication service, to generate a symmetric key as a function of the public key, to configure an authentication token to incorporate the symmetric key, to encrypt the symmetric key utilizing the public key, and to transmit the encrypted symmetric key to the address so as to permit the authentication service to bind the symmetric key to an identifier of the authentication token.

By way of example, the authentication token may comprise a software authentication token implemented on the processing device. The processing device may comprise a mobile telephone, computer or other user device.

One or more tokencodes generated by the authentication token utilizing the symmetric key are transmitted to the authentication service for authentication. The authentication by the authentication service is based on the symmetric key bound to the identifier of the authentication token.

In another embodiment, a processing device is configured to provide an address and a public key, both associated with an authentication service, to receive at the address an encrypted symmetric key generated as a function of the public key, and to bind the symmetric key to an identifier of an authentication token. The processing device in such an embodiment may comprise an authentication server that provides the authentication service.

Other embodiments include without limitation methods, apparatus, systems, and articles of manufacture comprising processor-readable storage media.

DETAILED DESCRIPTION

Illustrative embodiments of the present invention will be described herein with reference to exemplary authentication systems and associated user devices, authentication servers and other processing devices. It is to be appreciated, however, that the invention is not restricted to use with the particular illustrative system and device configurations shown. Accordingly, the term "authentication system" as used herein is intended to be broadly construed, so as to encompass any type of system in which tokencodes generated by an authentication token are utilized for user authentication.

Figure 1:
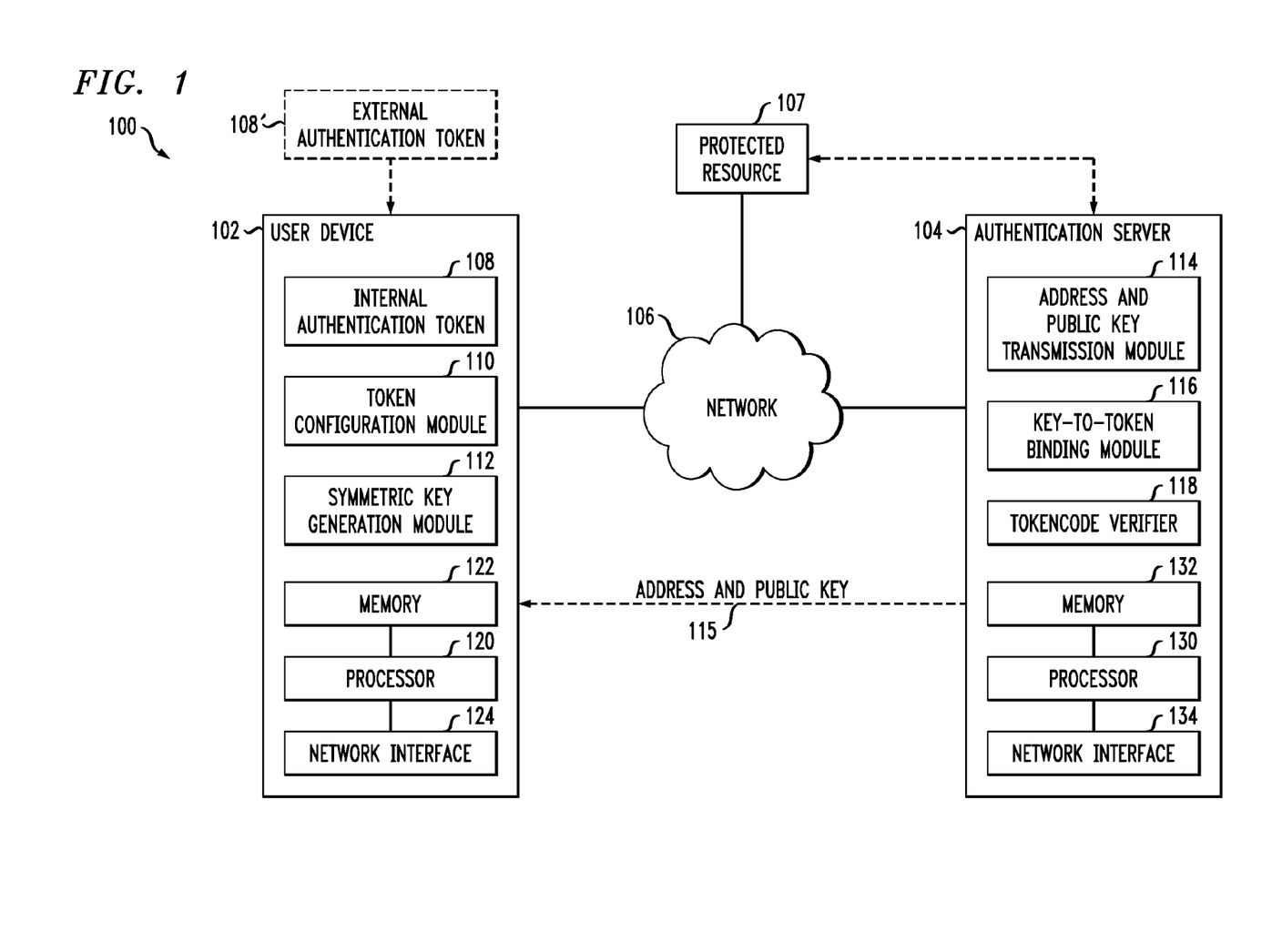
FIG. 1 is a block diagram of an authentication system with authentication token provisioning functionality in an illustrative embodiment of the invention.

FIG. 1 shows an authentication system 100 that implements authentication token provisioning functionality in an illustrative embodiment. The authentication system comprises a user device 102 that communicates with an authentication server 104 over a network 106 in order to obtain access to a protected resource 107. The user device 102 comprises an internal authentication token 108, and is additionally or alternatively associated with an external authentication token 108'. By way of example, the internal authentication token 108 illustratively comprises a software authentication token implemented in the form of an application running on the user device 102, and the external authentication token 108' comprises a hardware authentication token.

The user device 102 may comprise, for example, a mobile telephone, a laptop or tablet computer, a desktop computer, a gaming console or another type of user device as well as various combinations of multiple distinct devices. Each such device may be associated with a corresponding user that authenticates to the authentication server 104 in order to obtain access to the protected resource 107, where "user" as the term is applied herein should be generally construed so as to encompass, for example, a human user or an associated hardware or software entity. Numerous alternative arrangements are possible.

The authentication server 104 may comprise any type of processing device or set of such devices that is operative to authenticate a tokencode generated by one of the authentication tokens 108 or 108' associated with the user device 102. Such a tokencode may be combined with a PIN for purposes of two-factor authentication as previously described. A combined tokencode and PIN is sometimes referred to as a "passcode." The authentication server 104 need not be a network-based server, and may be implemented as a portion of a device that performs other functions, as a combination of multiple servers or other devices, or in other forms. In other embodiments, alternative processing device arrangements not involving an authentication server may be utilized in providing an authentication service.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The protected resource 107 may comprise, for example, a multi-user computer system, a web site, an application, etc. A given such protected resource may reside at least in part on the user device 102 rather than being separate from that device as illustrated in the figure.

The user device 102 comprises an internal authentication token 108, a token configuration module 110 and a symmetric key generation module 112.

The user device 102 in the present embodiment is configured to obtain an address and a public key via at least one communication channel 115 as indicated. The address and public key are both associated with an authentication service provided in this embodiment by the authentication server 104, but in other embodiments such a service may be provided by multiple authentication servers, possibly operating in a distributed manner.

The channel 115 in some embodiments is a network channel associated with network 106, but in other embodiments is implemented as an out-of-band channel relative to network 106. As another example, element 115 may represent two separate channels, one over which the address is obtained by the user device and the other over which the public key is obtained by the user device, although other arrangements of one or more channels for communicating an address and public key associated with an authentication service can be used.

The authentication server 104 comprises an address and public key transmission module 114, a key-to-token binding module 116 and a tokencode verifier 118. The address and public key transmission module 114 provides the address and public key to the token configuration module 110 of user device 102, over at least one channel 115.

The symmetric key generation module 112 generates a symmetric key as a function of the public key obtained via the channel 115. The token configuration module 110 provisions the authentication token 108 or 108' with the symmetric key as its secret key. In addition, the token configuration module 110 encrypts the secret key using the public key and transmits the encrypted symmetric key to the address associated with the authentication service provided by authentication server 104. The key-to-token binding module 116 decrypts the encrypted symmetric key and binds the symmetric key to an identifier of the authentication token.

After the authentication token 108 or 108' has been provisioned with the symmetric key as its secret key and the symmetric key has been bound to the identifier of the authentication token in the authentication server 104, tokencodes generated by the authentication token utilizing the symmetric key are transmitted to the authentication server for authentication. The authentication of a given submitted tokencode is performed by the tokencode verifier 118 based on the symmetric key bound to the identifier of the authentication token.

Instead of or in addition to utilizing tokencodes provided by internal authentication token 108, the user device 102 may utilize tokencodes provided by external authentication token 108'. The authentication tokens 108 and 108' may be implemented as respective software and hardware authentication tokens. For example, internal authentication token 108 may be implemented as a time-synchronous software token running on processing hardware within the user device 102, and external authentication token 108' may comprise a time-synchronous hardware token such as the above-noted RSA SecurID® that is implemented as a separate hardware device relative to the user device 102.

A time-synchronous hardware or software token of this type typically generates tokencodes in the form of sequences of digits or other characters, such as sequences of 6 digits or other characters. Each of the tokencodes in a given series of tokencodes is valid only for a particular period of time, such as, for example, a minute. Accordingly, the tokencode output of the authentication token in this case is updated approximately once every minute. These update time periods are also referred to as "epochs."

Other types of authentication tokens can be used, including an event-synchronous authentication token, a challenge-response token, a hash-chain token, or a hybrid token that incorporates multiple such capabilities, such as a hybrid time-synchronous and event-synchronous token.

As indicated above, in some embodiments a tokencode is combined with a personal identifier for authentication. It is assumed without limitation that the personal identifier comprises a PIN, although other types of personal identifiers can be used.

For example, the PIN may comprise a sequence of 8 characters, and the tokencode may comprise a sequence of 6 characters, resulting in a passcode that is 14 characters in length. Such an arrangement is consistent with the use of the above-noted RSA SecurID® authentication token, although as indicated previously, other types of tokens, and thus personal identifier and tokencode formats, may be used. The term "passcode" as used herein is also intended to be broadly construed and should be understood to encompass any arrangement of words, phrases, numbers or other combinations of characters collectively comprising a personal identifier and a tokencode for user verification.

It is also to be appreciated that some embodiments are configured to authenticate based on only a tokencode, rather than a combination of a tokencode and a PIN. References herein to authentication of a user based on a tokencode should be understood to encompass arrangements in which authentication is based on both a tokencode and a user PIN or other type of personal identifier, as well as other similar authentication arrangements. In such embodiments, the tokencode verifier 118 is suitably configured to verify the PIN or other personal identifier in conjunction with verification of the tokencode.

The tokencode is assumed to be transmitted by the user device 102 to the authentication server 104 over the network 106. Alternatively, the user device 102 may provide the tokencode to the protected resource 107 which in turn sends the tokencode to the authentication server 104 for verification.

The external authentication token 108' may present tokencodes to a user via a display of the token, such that the user can manually enter the tokencodes into the user device 102. Alternatively, a given tokencode may be communicated directly from the external authentication token to the user device 102 via a wired or wireless connection between the token and the user device. By way of example, the external authentication token may be configured to communicate with the user device 102 via a wired connection such as a USB interface, or via a wireless connection such as a Bluetooth or IEEE 802.11 connection.

The internal authentication token 108 may also present tokencodes on a display for manual entry by a user, or may automatically communicate those tokencodes to the appropriate module(s) on the user device 102.

A given authentication token may be a connected token or a disconnected token, or one capable of operating in both connected and disconnected modes.

Although two authentication tokens are shown in FIG. 1, only a single authentication token is needed in a given embodiment, and it may be implemented as a hardware or software authentication token. Some implementations may include only internal token 108, and others may include only external token 108'. Accordingly, the token 108' is illustratively shown in dashed outline in the figure.

Figure 2:
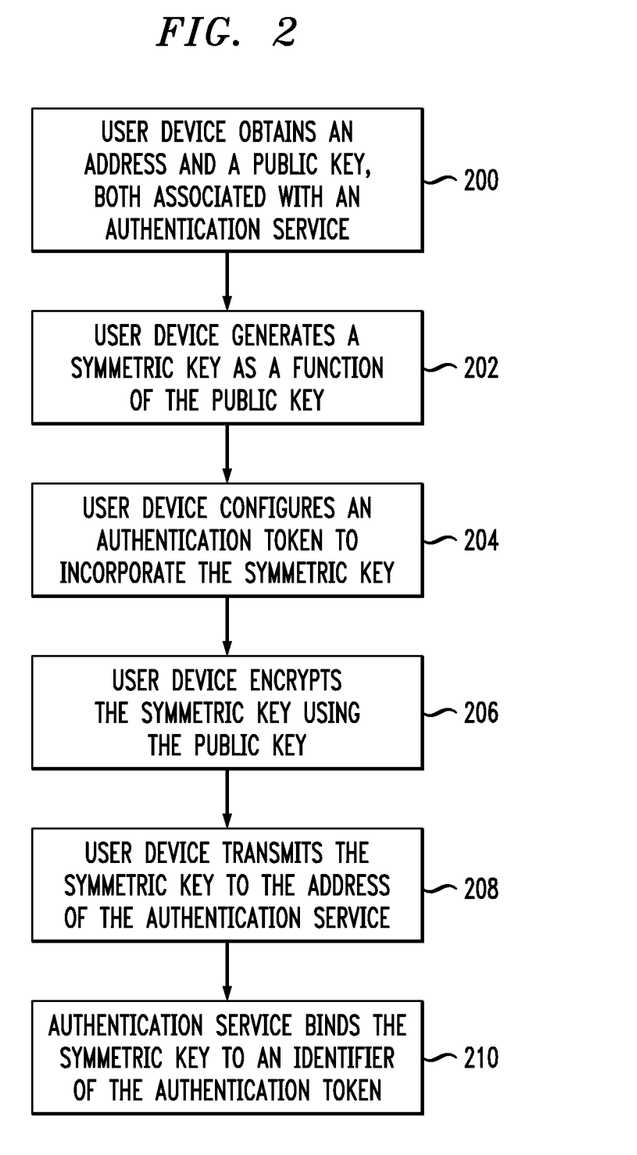
FIG. 2 is a flow diagram of a process for authentication token provisioning in an illustrative embodiment.

The operation of the user device 102 and authentication server 104 in provisioning an authentication token 108 or 108' in the authentication system 100 is illustrated in more detail in the flow diagram of FIG. 2. In this embodiment, an exemplary authentication token provisioning process includes steps 200 through 210.

In step 200, the user device 102 obtains an address and a public key, both associated with an authentication service. As noted above, the authentication service is provided by the authentication server 104 in the present embodiment, although other arrangements for providing an authentication service can be used in other embodiments.

By way of example, the address and public key are obtained in some embodiments by receiving the address in a message from an authentication server 104 or another system entity, utilizing the address to establish a connection with the authentication server 104, receiving a certificate from the authentication server, and extracting the public key from the certificate. The message in such an embodiment illustratively comprises an email message, a text message transmitted using Short Message Service (SMS), a multimedia message transmitted using Multimedia Message Service (MMS), or another type of message deliverable over network 106 or channel 115.

In these and other embodiments, the address and the public key may be obtained at least in part utilizing information presented on a display of the user device 102.

It is also possible to obtain the address and public key at least in part as a result of decoding a decoded representation, such as a quick response (QR) code.

The address obtained in step 200 of the FIG. 2 process illustratively comprises a network address of the authentication server 104 providing the authentication service, such as a secure HTTP (HTTPS) address of the authentication server. Numerous other network address types or address formats may be used.

In step 202, the user device 102 generates a symmetric key as a function of the public key. This operation is performed by the symmetric key generation module 112. For example, the symmetric key is illustratively generated as a function of the public key by conditioning the symmetric key on the public key itself, or by conditioning the symmetric key on a certificate containing the public key. More specific examples of such arrangements will be described in detail below.

In step 204, the user device 102 configures the authentication token 108 or 108' to incorporate the symmetric key. This operation is performed by the token configuration module 110, and is assumed to involve providing the symmetric key to secure storage associated with the appropriate authentication token. Although the FIG. 2 process as illustrated in the figure contemplates provisioning of a single authentication token, separate instances of this exemplary process, possibly performed at least in part in parallel with one another, can be used to provision each of the internal and external authentication tokens, or other arrangements of multiple authentication tokens.

In step 206, the user device 102 encrypts the symmetric key using the public key. This operation is illustratively performed by the token configuration module 110, but in other embodiments can be performed by a separate encryption module.

In step 208, the user device 102 transmits the symmetric key to the address of the authentication service. Again, this operation is illustratively performed by the token configuration module 110, but in other embodiments can be performed by a separate symmetric key transmission module.

In step 210, the authentication service provided by the authentication server 104 binds the symmetric key to an identifier of the authentication token. In some embodiments, before such binding takes place, the user authenticates to the authentication service using other authentication information prior to the authentication service binding the symmetric key to the identifier of the authentication token. The term "identifier" in this context is intended to be broadly construed, and accordingly may encompass an identifier of a particular user associated with a given authentication token. Such binding may therefore be viewed as associating a particular user with a symmetric key stored for a particular authentication token corresponding to that user.

A number of examples of possible implementations of the FIG. 2 authentication token provisioning process will now be described in more detail.

It is assumed for these examples that the symmetric key is generated in a software application running on the user device 102 and registered securely with a remote authentication service associated with authentication server 104 whose identity is provided externally to the application over a potentially untrusted channel. Such an arrangement can be used to provision a software authentication token with a seed or other secret key and to provide the seed or other secret key to the remote authentication service, where the secret key is an example of what is more generally referred to herein as a "symmetric key." Arrangements of this type in illustrative embodiments advantageously avoid the need for extensive user involvement, and can prevent man-in-the-middle attacks against the untrusted channel, such as interception of token initialization data by an adversary.

It is more particularly assumed for these examples that the user device 102 comprises a mobile device such as telephone, laptop or tablet that runs an authentication token application. The authentication token application is an example of what is more generally referred to herein as a "software authentication token." The authentication token application is not initially configured with the identity of a particular authentication service X with which the user wants to register. Instead, the identity of the authentication service X is furnished to the user by some channel, such as email or visual presentation on a computer screen, that is independent of the application itself and potentially untrustworthy.

In the present examples, the identity of the authentication service X obtained in step 200 is assumed to be specified as a resource address R and a public key $PK_X$. The authentication token application, then, generates a symmetric key $\kappa_{A,X}$ that depends on $PK_X$ and transmits it to X encrypted under $PK_X$.

Let A denote the authentication token application implemented on the mobile device of a particular user U. Let $(SK_X, PK_X)$ denote a secret key-public key pair associated with the authentication service X.

The authentication token application A takes as its input the resource address-public key pair $(R, PK_X)$. The pair $(R, PK_X)$ can be provided to the authentication token application in a variety of ways. For example, the user may receive an email containing an HTTPS address R which, when clicked upon, presents the address R to application A. The associated public key $PK_X$ is then extracted from a valid certificate transmitted from R upon successful connection. As another example, the pair $(R, PX_X)$ may be visually presented, such as encoded in a QR code displayed on a laptop screen or on a piece of paper given to the user. As will be described, the manner in which the symmetric key $\kappa_{A,X}$ is generated and transmitted to authentication service X ensures that the key cannot be obtained even by an adversary that learns $(R, PK_X)$ and attempts to mount a man-in-the-middle attack.

After obtaining the pair $(R, PK_X)$, the authentication token application A randomly generates the symmetric key $\kappa_{A,X}$. For example, the symmetric key may be generated as $\kappa_{A,X}=H(PK_X,r\{s\})$ where H denotes a one-way function, r is a random (e.g., 256-bit) seed generated by A, and s is a random, one-time seed optionally furnished by X (e.g., in the case where X and A communicate bidirectionally) as a hedge against potential "bad" randomness in A. This is one example of an arrangement in which the symmetric key $\kappa_{A,X}$ is generated as a function of the public key $PK_X$. The resulting symmetric key is made accessible to or otherwise provided to a tokencode generator of the authentication token implemented by the authentication token application.

The authentication token application A then encrypts the symmetric key as a ciphertext $C=Enc_{PK_X}[\kappa_{A,X}]$, where Enc denotes encryption using the public key, and transmits the encrypted symmetric key to the authentication service X. For example, A may transmit to X at the furnished address R the following triple:

$$T=(C,A,M=MAC_{\kappa_{A,X}}[(C,A)]).$$

where M denotes a message authentication code (MAC). In the case where T is transmitted over a suitably secure channel, such as a channel protected by transport layer security (TLS), it is instead possible to let $T=(A,\kappa_{A,X})$.

Upon receipt of T, the authentication service X decrypts C and verifies T. In particular, X decrypts the symmetric key $\kappa_{A,X}$ and verifies the MAC M. If the decryption and verification succeed, then X records the association $(A,\kappa_{A,X})$.

It should be noted that any user can create a valid tuple for A and thus cause X to create the association $(A,\kappa_{A,X})$ Accordingly, the provisioning process in the present examples further includes X binding a particular user U to $\kappa_{A,X}$. While A and X share the secret $\kappa_{A,X}$, for U to authenticate using A, it is necessary for U to prove his or her identity to X in the same context that he or she proves ownership of A. As the authentication token application is assumed to be associated with a particular user, this exemplary binding may be viewed as a type of binding of the symmetric key to the authentication token application.

Such binding may be accomplished after recording of $(A,\kappa_{A,X})$ by having U authenticate to service X using A and some other trustworthy proof of identity. For example, U might initially authenticate to service X using a password supplied via an out-of-band channel. Alternatively, U may be authenticated prior to registration. For example, U may receive an email message comprising a customized link to R that includes a secret key such that use of the link binds U to A.

Such an arrangement may be implemented, for example, in a scenario in which U is a new employee at an enterprise corresponding to X. Thus, in this scenario, the authentication service is the enterprise itself. When U reports for work, he or she is assigned an Active Directory password P, and is instructed to download the authentication token application A onto his or her mobile device from an application store. U then receives an email message on his or her mobile device, potentially at a personal email address, containing a link to a TLS-secured website R administered by X.

When U clicks on the link, A visits R, extracts public key $PK_X$ from the certificate presented by R, and computes a seed $\sigma = MAC_{h(PK_X)}[h(r,s)]$, where h is a hash function, r is a key generated by A and s is a random value supplied by the authentication server. Then A sends $\sigma$ to R over a TLS-protected channel. U is prompted, then, to authenticate using P. If U is successful, the seed $\sigma$ is associated with U's authentication token application A. U can then use his or her token to authenticate to X.

In other embodiments, rather than conditioning $\kappa_{A,X}$ on $PK_X$, it is possible to condition it on a certificate containing $PK_X$. This approach allows for detection of a revoked certificate in case of compromise of $SK_X$. For simplicity, however, the foregoing examples describe conditioning $\kappa_{A,X}$ on $PK_X$, by generating $\kappa_{A,X}$ as a function of $PK_X$.

It is also possible for $\kappa_{A,X}$ not to be conditioned on $PK_X$, but instead for A to store a unique association between the two values. Accordingly, conditioning should be viewed as an example of a simple, strong mechanism for ensuring that a given key is not associated with multiple services in a manner that significantly undermines security, but other arrangements may be used to establish an association between the generated symmetric key and the public key obtained from the authentication service.

The examples described above do not require the pair $(R, PK_X)$ to be delivered over a secure (e.g., confidential or authenticated) channel. Even if the channel is controlled by an adversary, the adversary cannot feasibly impersonate the user by intercepting $\kappa_{A,X}$. The ability to use unsecured channels is desirable when enrolling a user in an authentication system, as there may be little or no preestablished relationship between U and X. For instance, in one of the scenarios described above, the pair $(R, PK_X)$ is sent to U's personal email address. The enterprise itself cannot ensure the security of this form of communication.

An adversary on the channel over which $(R, PK_X)$ is delivered can mount several different types of attacks. For example, the adversary can intercept $(R, PK_X)$ and register a desired pair $(\tilde{A}, \tilde{\kappa}_{\tilde{A},X})$ with X. In this case, however, assuming the adversary cannot impersonate the user in the binding operation of step 210, the adversary will not be able to register $\tilde{\kappa}_{\tilde{A},X}$ as a key corresponding to U.

As another example, the adversary can substitute a new pair $(\tilde{R}, PK_{\tilde{X}})$, where $\tilde{R}$ is a service in control of the adversary and the adversary knows $SK_{\tilde{X}}$. The adversary, then, can intercept a key $\kappa_{A,\tilde{X}}$ submitted by user U's application A. As $\kappa_{A,\tilde{X}}$ is generated using $PK_{\tilde{X}}$, however, A will not use the key to authenticate to X. Consequently, the adversary cannot use this key to impersonate U.

The particular processing operations and other system functionality described in conjunction with the flow diagram of FIG. 2 are presented by way of illustrative example only, and should not be construed as limiting the scope of the invention in any way. Alternative embodiments can use other types of processing operations for provisioning of authentication tokens as disclosed herein. For example, the ordering of the process steps may be varied in other embodiments, or certain steps may be performed concurrently with one another rather than serially. Also, the process steps may be repeated periodically in conjunction with respective distinct provisioning instances.

The user device 102 and authentication server 104 in the FIG. 1 embodiment are implemented as respective processing devices. Each such processing device generally comprises at least one processor and an associated memory, and implements one or more functional modules for controlling certain features of the system 100.

Referring again to FIG. 1, the user device 102 comprises a processor 120 coupled to a memory 122 and a network interface 124.

The processor 120 may comprise a microprocessor, a microcontroller, an application-specific integrated circuit (ASIC), a field-programmable gate array (FPGA) or other type of processing circuitry, as well as portions or combinations of such circuitry elements.

The memory 122 may comprise random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

The network interface 124 allows the user device 102 to communicate over the network 106 with the authentication server 104 and protected resource 107, and may comprise one or more conventional transceivers.

One or more of internal authentication token 108, token configuration module 110 and symmetric key generation module 112 of the user device 102 may be implemented at least in part in the form of software that is stored in memory 122 and executed by processor 120.

Like the user device 102, the authentication server 104 comprises a processor 130 coupled to a memory 132 and a network interface 134.

The processor 130, like processor 120 in user device 102, may similarly comprise a microprocessor, a microcontroller, an ASIC, an FPGA or other type of processing circuitry, as well as portions or combinations of such circuitry elements.

The memory 132, like memory 122 in user device 102, may similarly comprise RAM, ROM or other types of memory, in any combination.

The network interface 134 allows the authentication server 104 to communicate over the network 106 with the user device 102 and the protected resource 107 and may comprise one or more conventional transceivers.

One or more of address and public key transmission module 114, key-to-token binding module 116 and token-code verifier 118 of the authentication server 104 may be implemented at least in part in the form of software that is stored in memory 132 and executed by processor 130.

The above-noted network interfaces 124 and 134 may also be used to support various types of communication utilizing out-of-band channels.

For example, an out-of-band channel not involving communication over network 106 may be utilized by the authentication server 104 to communicate with the protected resource 107. As another example, an out-of-band channel not involving communication over network 106 may be utilized by the authentication server 104 to provide its address and public key to the user device 102. The channel 115 in some embodiments is considered an example of the latter type of channel. These channels are illustratively shown using dashed lines in the figure, to indicate that these channels may be implemented in an out-of-band manner.

The term "out-of-band channel" in this context is intended to be broadly construed so as to encompass, for example, a different network connection or other type of communication medium than that typically used for communication between two or more of user device 102, authentication server 104 and protected resource 107.

Alternatively, communications over network 106 may be used in place of one or both of the exemplary channels shown by dashed lines between user device 102, server 104 and protected resource 107 in FIG. 1.

Therefore, although illustratively shown as being separate from network 106, out-of-band channels in the FIG. 1 embodiment may instead pass through different portions of network 106, or otherwise be configured in an out-of-band manner relative to one or more other communication links between two or more of system elements 102, 104 and 107. Examples of out-of-band channels that may be utilized in embodiments of the present invention include text or multimedia messaging channels, email channels, telephony channels, etc.

It is to be understood that the particular set of elements shown in FIG. 1 for providing authentication token provisioning functionality is presented by way of illustrative example only, and in other embodiments additional or alternative elements may be used. Thus, another embodiment may include additional networks and additional sets of user devices, authentication servers or protected resources, and different arrangements of device or server modules and other components.

Also, a variety of different authentication processes may be used in embodiments of the invention. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

As mentioned previously, various elements of system 100 such as modules associated with user device 102 and authentication server 104 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices.

Such processing platforms may include cloud infrastructure comprising virtual machines (VMs) and one or more associated hypervisors. An example of a commercially available hypervisor platform that may be used to implement portions of the system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass.

A variety of other storage products and other processing platform components may be utilized to implement at least a portion of the system 100.

It is to be appreciated that authentication token provisioning functionality such as that described in conjunction with FIGS. 1 and 2 can be implemented at least in part in the form of one or more software programs stored in memory and executed by a processor of a processing device such as a computer or server. As mentioned previously, a memory or other storage device having such program code embodied therein is an example of what is more generally referred to herein as a "processor-readable storage medium."

The embodiments described in conjunction with FIGS. 1 and 2 can provide a number of significant advantages relative to conventional practice. For example, these embodiments provide authentication token provisioning techniques that exhibit enhanced efficiency and security relative to conventional techniques, and can be readily deployed at low cost using existing authentication tokens and other infrastructure.

It should again be emphasized that the above-described embodiments of the invention are presented for purposes of illustration only. Many variations and other alternative embodiments may be used. For example, the techniques are applicable to a wide variety of other types of authentication systems and processing devices that can benefit from enhanced efficiency and security in authentication token provisioning. Also, the particular configuration of system and device elements shown in FIG. 1, and the associated authentication token provisioning process described in conjunction with FIG. 2, can be varied in other embodiments. In addition, the particular key formats, encryption functions and other exemplary features of the illustrative embodiments may be varied to meet the particular needs of other implementations. These and numerous other alternative embodiments within the scope of the appended claims will be readily apparent to those skilled in the art.

What is claimed is:

1. A method comprising:
   obtaining an address associated with an authentication service over a channel not secured by the authentication service, wherein obtaining the address comprises receiving a link, to a secured website administered by the authentication service, that is customized by the authentication service for a given user of an authentication token;
   utilizing the customized link to obtain a public key associated with the authentication service via the secured website administered by the authentication service;
   generating a symmetric key as a function of the public key and a value generated by the authentication token;
   configuring the authentication token to incorporate the symmetric key;
   encrypting the symmetric key utilizing the public key; and
   binding the symmetric key to an identifier of the authentication token and to an identity of the given user of the authentication token by:
      transmitting the encrypted symmetric key to the address associated with the authentication service via the secured website administered by the authentication service;
      recording an association between the authentication token and the symmetric key; and
      authenticating the given user to the authentication service, in conjunction with recording the association between the authentication token and the symmetric key, utilizing a proof of identity of the given user provided to the authentication service via the secured website administered by the authentication service;

wherein the method is performed by at least one processing device comprising a processor coupled to a memory.

2. The method of claim 1 wherein the authentication token comprises a software authentication token implemented on the processing device.

3. The method of claim 2 wherein the software authentication token implemented on the processing device comprises an application running on the processing device.

4. The method of claim 1 further comprising:
generating a tokencode in the authentication token utilizing the symmetric key; and
transmitting the tokencode to the authentication service for authentication.

5. The method of claim 1 wherein obtaining the address and the public key comprises:
receiving the address in a message;
utilizing the address to establish a connection with a server;
receiving a certificate from the server; and
extracting the public key from the certificate.

6. The method of claim 5 wherein the message comprises one of an email message, a text message and a multimedia message.

7. The method of claim 1 wherein obtaining the address and the public key comprises obtaining the address and the public key utilizing information presented on a display of the processing device.

8. The method of claim 1 wherein obtaining the address and the public key comprises:
decoding a coded representation; and
obtaining the address and the public key from a result of the decoding.

9. The method of claim 8 wherein the coded representation comprises a QR code.

10. The method of claim 1 wherein the address comprises a network address of an authentication server providing the authentication service.

11. The method of claim 1 wherein the address comprises an HTTPS address.

12. The method of claim 1 wherein generating a symmetric key as a function of the public key comprises conditioning the symmetric key on the public key itself.

13. The method of claim 1 wherein generating a symmetric key as a function of the public key comprises conditioning the symmetric key on a certificate containing the public key.

14. The method of claim 1 wherein authenticating the given user to the authentication service in conjunction with recording the association between the authentication token and the symmetric key comprises authenticating the given user to the authentication service prior to recording the association between the authentication token and the symmetric key.

15. The method of claim 1 wherein the proof of identity of the given user comprises a password supplied via an out-of-band channel.

16. The method of claim 1 wherein generating the symmetric key comprises generating the symmetric key as a function of the public key, the value generated by the authentication token and a value supplied by the authentication service.

17. An article of manufacture comprising a non-transitory processor-readable storage medium having embodied therein one or more software programs, wherein the one or more software programs when executed by at least one processing device cause the at least one processing device:
to obtain an address associated with an authentication service over a channel not secured by the authentication service, wherein obtaining the address comprises receiving a link, to a secured website administered by the authentication service, that is customized by the authentication service for a given user of an authentication token;
to utilize the customized link to obtain a public key associated with the authentication service via the secured website administered by the authentication service;
to generate a symmetric key as a function of the public key and a value generated by the authentication token;
to configure the authentication token to incorporate the symmetric key;
to encrypt the symmetric key utilizing the public key; and
to bind the symmetric key to an identifier of the authentication token and to an identity of the given user of the authentication token by:
transmitting the encrypted symmetric key to the address associated with the authentication service via the secured website administered by the authentication service;
recording an association between the authentication token and the symmetric key; and
authenticating the given user to the authentication service, in conjunction with recording the association between the authentication token and the symmetric key, utilizing a proof of identity of the given user provided to the authentication service via the secured website administered by the authentication service.

18. An apparatus comprising:
at least one processing device comprising a processor coupled to a memory;
wherein said at least one processing device is configured:
to obtain an address associated with an authentication service over a channel not secured by the authentication service, wherein obtaining the address comprises receiving a link, to a secured website administered by the authentication service, that is customized by the authentication service for a given user of an authentication token;
to utilize the customized link to obtain a public key associated with the authentication service via the secured website administered by the authentication service;
to generate a symmetric key as a function of the public key and a value generated by the authentication token;
to configure the authentication token to incorporate the symmetric key;
to encrypt the symmetric key utilizing the public key; and
to bind the symmetric key to an identifier of the authentication token and to an identity of the given user of the authentication token by:
transmitting the encrypted symmetric key to the address associated with the authentication service via the secured website administered by the authentication service;

recording an association between the authentication token and the symmetric key; and authenticating the given user to the authentication service, in conjunction with recording the association between the authentication token and the symmetric key, utilizing a proof of identity of the given user provided to the authentication service via the secured website administered by the authentication service.

19. The apparatus of claim 18 wherein the processing device comprises one of a mobile telephone and a computer.

20. The apparatus of claim 18 wherein the authentication token comprises a software authentication token implemented on the processing device.

21. A method comprising: providing an address associated with an authentication service over a channel not secured by the authentication service, wherein providing the address comprises sending a link, to a secured website administered by the authentication service, that is customized by the authentication service for a given user of an authentication token; utilizing the customized link to provide a public key associated with the authentication service via the secured website administered by the authentication service; and binding a symmetric key to an identifier of the authentication token and to an identity of the given user of the authentication token by: receiving, via the secured website administered by the authentication service, an encrypted symmetric key generated as a function of the public key and a value generated by the authentication token; recording an association between the authentication token and the symmetric key; and authenticating the given user to the authentication service, in conjunction with recording the association between the authentication token and the symmetric key, utilizing a proof of identity of the given user received by the authentication service via the secured website administered by the authentication service; wherein the method is performed by at least one processing device comprising a processor coupled to a memory.

22. An article of manufacture comprising a non-transitory processor-readable storage medium having embodied therein one or more software programs, wherein the one or more software programs when executed by at least one processing device cause the at least one processing device: to provide an address associated with an authentication service over a channel not secured by the authentication service, wherein providing the address comprises sending a link, to a secured website administered by the authentication service, that is customized by the authentication service for a given user of an authentication token; to utilize the customized link to provide a public key associated with the authentication service via the secured website administered by the authentication service; and to bind a symmetric key to an identifier of the authentication token and to an identity of the given user of the authentication token by: receiving, via the secured website administered by the authentication service, an encrypted symmetric key generated as a function of the public key and a value generated by the authentication token; recording an association between the authentication token and the symmetric key; and authenticating the given user to the authentication service, in conjunction with recording the association between the authentication token and the symmetric key, utilizing a proof of identity of the given user received by the authentication service via the secured website administered by the authentication service.

23. An apparatus comprising: at least one processing device comprising a processor coupled to a memory; wherein said at least one processing device is configured: to provide an address associated with an authentication service over a channel not secured by the authentication service, wherein providing the address comprises sending a link, to a secured website administered by the authentication service, that is customized by the authentication service for a given user of an authentication token; to utilize the customized link to provide a public key associated with the authentication service via the secured website administered by the authentication service; and to bind a symmetric key to an identifier of the authentication token and to an identity of the given user of the authentication token by: receiving, via the secured website administered by the authentication service, an encrypted symmetric key generated as a function of the public key and a value generated by the authentication token; recording an association between the authentication token and the symmetric key; and authenticating the given user to the authentication service, in conjunction with recording the association between the authentication token and the symmetric key, utilizing a proof of identity of the given user received by the authentication service via the secured web site administered by the authentication service.

* * * * *